MAGNETIC MEMORY ARRANGEMENT

Filed April 6, 1960

2 Sheets-Sheet 1

INVENTORS
RUNE BERNHARD BERNEMYR
KARL GÖSTA HERBERT LINDBERG
BENGT GUNNAR MAGNUSSON
CARL GUNNAR SVALA
BY Hane and Nydick
ATTORNEYS

MAGNETIC MEMORY ARRANGEMENT

Filed April 6, 1960

INVENTORS
RUNE BERNHARD BERNEMYR
KARL GÖSTA HERBERT LINDBERG
BENGT GUNNAR MAGNUSSON
CARL GUNNAR SVALA
BY Hane and Nydick
ATTORNEYS 3,102,999

MAGNETIC MEMORY ARRANGEMENT

Rune Bernhard Bernemyr, Farsta, Karl Gösta Herbert Lindberg, Bandhagen, and Bengt Gunnar Magnusson, Farsta, Sweden, and Carl Gunnar Svala, Galion, Ohio, assignors to Telefonaktiebolaget L M Ericsson, Stockholm, Sweden, a corporation of Sweden Filed Apr. 6, 1960, Ser. No. 20,350
Claims priority, application Sweden Apr. 10, 1959
7 Claims. (Cl. 340—174)

The present invention relates to a magnetic memory device for data treatment systems, and more particularly to a device comprising a conductor network consisting of a number of substantially parallel feeding conductors and a number of substantially parallel reading conductors crossing said feeding conductors, the feeding conductors being electrically insulated from the reading conductors.

There are known memory devices in which the memory contents are changed by changes in the configuration of the conductor network, for instance, either by soldering or by mechanical contacts. However, there are some drawbacks to changing the conductor network in this way, as contact faults can easily occur whereby the data treatment does not occur according to the arranged program.

It is also known to arrange key controlled magnetic yokes over the cross points between each other crossing conductors, which yokes in a pressed down position are resting against magnetic cores, which are placed under the cross points, and as a result close a magnetic circuit around the conductors which are crossing each other. With such an arrangement, the existing contact problem is shifted from the electric circuits to the magnetic circuits, where a satisfactory function can be achieved even if the contact between the magnetic points of contact are not always perfect, but the arrangement is not very suitable for memory arrangements where the demands for a simple placing of the conductors and a simple and reliable but nevertheless flexible program are high.

The previously mentioned drawbacks are eliminated with a memory arrangement according to the present invention.

A memory arrangement formed according to the invention is characterized by a plate being arranged as a base for the feeding conductors and/or reading conductors, which plate consists of a highly permeable material at least at the cross points between the feeding conductors and the reading conductors and is covered by a metal plate of electrically well conductive material, and that said metal plate is covered by a plate, which consists of a highly permeable material at least in the cross points between the feeding conductors and the reading conductors, said metal plate having slots at certain cross points between the feeding conductors and the reading conductors which slots extend across said certain cross points in accordance with required treatment of the data fed to the memory arrangement.

Figure 1:
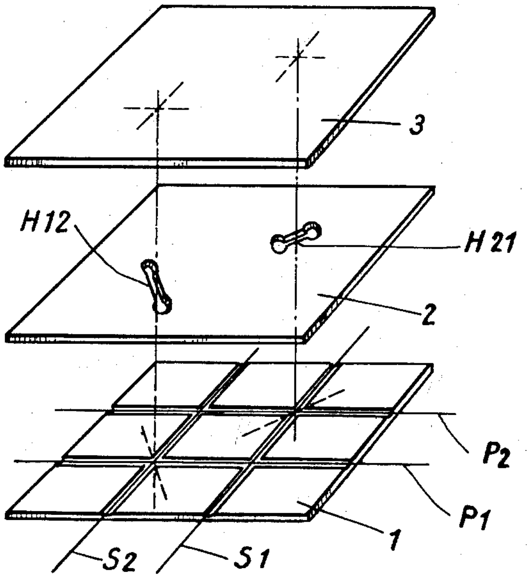
Figures 2, 3:
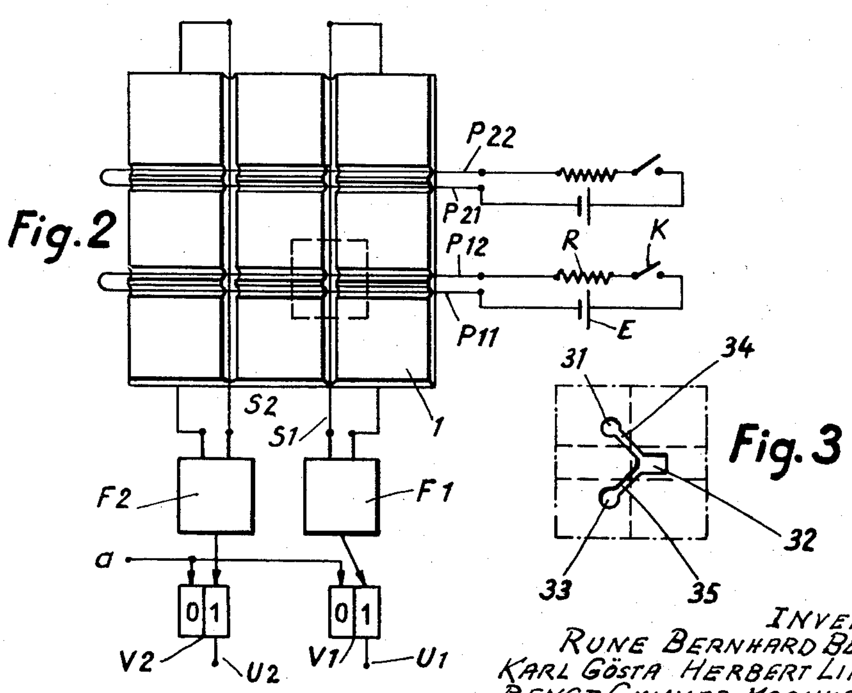
Figure 4:
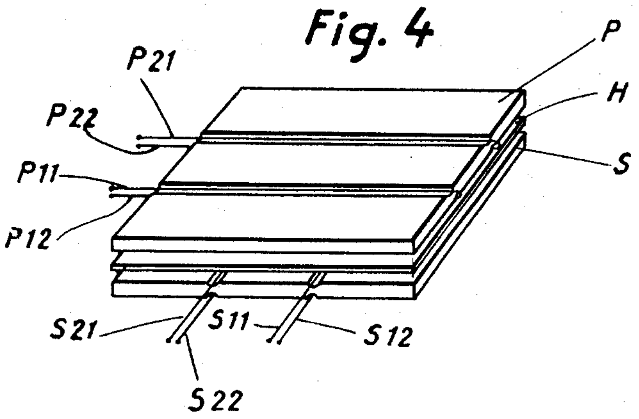
Figure 5:
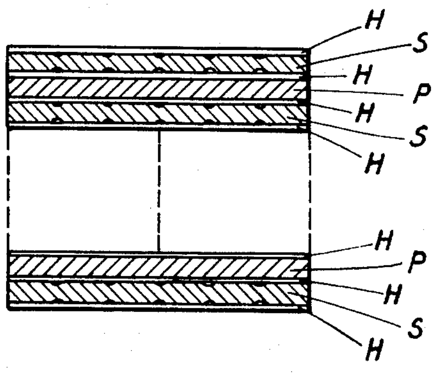
Figure 6:
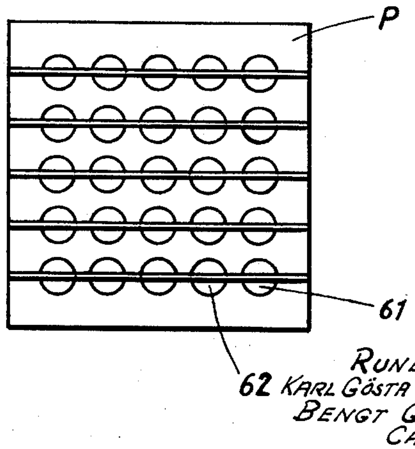

The invention will be further described in connection with the enclosed drawing where FIG. 1 shows an exploded view of a memory arrangement with three plane and parallel plates according to the invention. FIG. 2 shows a modification of one of the plates in the arrangement according to FIG. 1, FIG. 3 shows, greatly enlarged part of a plate intended for the arrangement according to FIG. 2. FIG. 4 shows a modification according to FIG. 1, FIG. 5 shows an enlargement of the arrangement according to FIG. 4, and FIG. 6 shows a modification of the plates in the arrangements previously shown.

In FIG. 1 numeral 1 indicates a plate of a highly permeable material, suitably a ferrite plate, the upper side of which is surface grinded, and by grinding or pressing in a non-sintered condition the plate has been provided with a system of grooves in which a conductor network is fixed, namely primary feeding conductors P1, P2 and secondary reading conductors S1, S2. In order to simplify the illustration, a conductor network with only two conductors of each kind has been shown, but in practice it is of course suitable and possible to provide a large number of conductors of each kind. The conductor network can be fixed by, for instance, a plating procedure in two stages so that a system of each other crossing conductors is obtained, which all are electrically insulated from each other. In the conductor network now described the magnetic coupling between each other crossing conductors is negligible.

The plate 1 with the conductor network P1, P2, S1, S2 is covered by a metal plate 2 of an electrically highly conductive material, for instance, copper foil. In order to show clearly the principal parts of the arrangement the same are shown separated from each other in FIG. 1; but in actual practice they are joined together in a compact, comparatively thin unit. The metal plate 2 is at certain cross points between the feeding conductors and the reading conductors formed with slots H extending across certain cross points selected with regard to the required treatment of the data fed to the memory arrangement. In the drawing two slots H of that kind are shown, namely the slot H12 for the crossing point between the feeding conductor P1 and the reading conductor S2 and the slot H21 for the crossing point between the feeding conductor P2 and the reading conductor S1. These slots may be formed in many different ways without departing from the scope of invention. The slots shown in the drawing define two widened openings and one web which connects the two openings. The two openings are diagonally placed in reference to the crossing conductors (e.g. P1 and S2) of the cross point and the web is placed directly above the cross point itself, that is, the slot H12 will have the direction which is indicated with a line of short dashes in the plane of the plate 1, while the slot H21 is turned 90° relative to this direction which also is indicated in FIG. 1. This possibility to give the slots different directions is made use of either in order to increase the signal safety, that is, to let outgoing data be composed of positive and negative potentials or to make a trinary code possible, that is, to let out-going data be composed of positive and negative potentials and 0-potential.

Said metal plate 2 is in its turn covered by a plate 3 which consists of a highly permeable material; even this can of course wholly consist of a ferrite plate.

The function of the plates 1, 2 and 3 which form a "sandwich" type memory arrangement is as follows. When electrical data are fed to the feeding conductors (P1, P2), rapid flow changes are normally prevented owing to an eddy current formation in the electrically well conductive plate 2 covering the secondary conductors (S1, S2), with the exception of the cross points where the plate 2 has slots. At these slots it will be possible for the magnetic flows close around the cross points, namely through the openings in the respective slot and the parts of the plates 1 and 3 adjoining this slot. No significant magnetic flow can be closed through openings belonging to different slots, as these openings are not mutually connected through a web and as the flow change is counteracted by short-circuiting currents.

The memory arrangement now described affords great advantages, as desired memory combinations can be conveniently effected by pressing, volatilization, depositing or etching of foils, which then can be exchanged as required.

It has not been described in connection with FIG. 1 in which manner the feeding of data occurs or how the reading occurs, as techniques suitable for the purpose are commonly known. For instance pulses can be fed to a feeding conductor via a selector arrangement, and then the reading occurs in bistable circuits which are connected to the reading conductors. If for instance a positive impulse is fed to the input conductor P1, this is in effect the same as feeding of data of the form 1.0. The occurrence of the slot H12 causes inducing of a voltage in the reading conductor S2, which voltage has to influence a bistable circuit to take "1"-position, that is from the reading conductors a data of the form 0.1 is obtained.

If feeding of data to the feeding conductors occurs via contact elements of the transistor type, it may be suitable to modify the arrangement according to FIG. 1 as shown in FIG. 2. Here the feeding conductors are placed in pairs close to each other, each in its groove in the plate 1 and are connected so that each pair of the feeding conductors forms a coil in the plane of the plate. The input conductor P1 in FIG. 1 corresponds in FIG. 2 to two conductors P11 and P12, which are placed each in its groove. The two grooves are close to each other in the plate 1, and the conductors are directly connected to each other on one side (to the left) and on the other side they are connected through a resistance R and a contact K to a voltage source E so that a closed coil is formed when the contact K is closed. This contact is presumed to form the emitter-collector gape in a transistor the base of which constitutes the input terminal for pulses intended for the coil in question. The reading conductors S1 and S2 are directly connected at one end to one input terminal of an amplifier F1 and F2 respectively, and the other end of each reading conductor is connected via a conductor outside the plate 1 to the other input terminal of the amplifiers. The amplifiers F1, F2 are, in turn, each connected to a bistable circuit V1, V2, which in order to make a neutral position possible are at the input side connected to a common neutral position terminal *a*. The output terminals (U1, U2) of the memory arrangement are connected to the output sides of the bistable circuits.

The metal plate 2, which is intended for coaction with the plate 1 according to FIG. 2, is provided with slots above certain cross points between the feeding conductors and the reading conductors, one of the slots being shown greatly enlarged in FIG. 3. This slot has three widened openings 31, 32, 33 and two webs 34 and 35 which connect said three openings. The openings 31 and 32 are diagonally placed relative to the cross point between the one feeding conductor P12 of the coil and the reading conductor S1, and the one web 34 is placed in an immediate juxtaposition to this cross point, while the remaining opening 33 and the nearest one (32) of the first mentioned openings are diagonally placed relative to the cross point between the remaining feeding conductor P11 of the coil and the reading conductor S1, and the remaining web 35 is placed in immediate juxtaposition to the last mentioned cross point.

Prior to the feeding of pulses to the conductors P11—P12 and P21—P22, a neutral position pulse is fed to the terminal *a* so that the circuits V1, V2 are brought to neutral positions. If then a data of the form 1.0 is fed, that is, the contact K for the conductors P11—P12 is closed, a datum of the form 1.0 is obtained via the output terminals U1, U2 owing to the slot above the cross points between the conductors P11—S1 and P12—S1. If instead the data 0.1 is fed, a datum of the form 0.0 is obtained, since there are no slots above the cross points between the coil P21—P22 and the reading conductors.

It is even possible with slots of the kind shown in FIG. 3 to achieve positive or negative pulses on the reading conductors by placing the slot either as shown in said FIG. 3, or also as image in relation to the vertically dashed line, that is with the opening 32 to the left and the openings 31, 33 to the right of said line.

In the forms of embodiment described until now, the conductor network which consists of each other crossing conductors, is placed on one and the same plate. This is, however, not necessary. It is also possible to place the conductors P1—P2 in the arrangement according to FIG. 1, just as shown in the drawing while the conductors S1—S2 are placed in grooves in the (concealed) bottom side of the plate 3. This affords certain technical advantages in manufacture due to the fact that only one type of plates need be manufactured. The plates then can be placed towards each other so that a conductor network with crossing conductors is obtained.

The arrangement shown in FIG. 4 also comprises three plates, namely, one primary plate P, one metal plate H (for instance, copper foil) and one secondary plate S. The primary plate P is formed with parallel grooves in each of its plane sides in such a way that a groove on one side lies just opposite a similar groove on the other side. In these mutually connected grooves the primary conductors P11—P12, P21—P22 are placed so that the primary plate P is surrounded by conductor pairs. The secondary plate S is formed in just the same way as the primary plate P, but is turned 90° relative to plate P. Hereby a conductor network is obtained with each other crossing conductors which are in different planes. Consequently the conductors P11 and P21 are in a plane close to the plane in which the conductors P12 and P22 are, while the conductors S11 and S21 are in a plane which is separated by plate H from the two first mentioned planes and the conductors S12 and S22 are in a plane, which is near to the plane of conductors S11 and S22.

The arrangement according to FIG. 4 is suitably built for a large number of conductors and several primary and secondary plates and interjacent metal plates (foils), see FIG. 5. In this way a memory arrangement with large capacity is obtained. The metal plate H which is indicated at the top and at the bottom in the arrangement according to FIG. 5 is intended for screening purposes.

When the reading conductors in the secondary plates form coils in conformity with what is shown in FIGS. 4 and 5 data must not be simultaneously fed to the conductors in primary plates next to each other.

It is obvious that the arrangement according to FIG. 5 can be used even when, as shown in FIG. 1, the conductor network with crossing conductors is arranged on one and the same plate, or when a plate is provided with conductors (P1—P2) lying only in one plane and the next following plate is provided with conductors (S1—S2) which are perpendicularly orientated towards said conductor and which also are lying only in one plane.

In the previous description it has been assumed that the plates P and S as a whole are formed for instance in ferrite material. However, this is not necessary. It is merely necessary that the plates consist of highly permeable material at the cross points of the conductor network, that is, at the points where an intermediate metal plate is possibly formed with slots. In FIG. 6 a primary plate P is shown which is formed according to this principle, and this plate is provided with grooves for conductors and consists at the cross points with the conductors in another plate (not shown) of inserts of highly permeable material in the shape of round plates 61, 62 and so on, while the remainder of plate P is formed of non-magnetic material. The arrangement according to FIG. 6 can be used for all the embodiments previously described or indicated. It may be mentioned that the inserts 61, 62 and so on must not necessarily be round; it is merely essential that the parts which overlie the slots in an adjacent metal plate H consist of highly permeable material.

It is evident that many other forms of embodiment come within the scope of invention and that the forms of embodiment on the drawings are only quite schematically showing what is considered as being most essential in accordance with the following claims.

We claim:

1. A magnetic memory device comprising at least two feeding conductors and two reading conductors, two plates having substantially high permeability, a conductive plate, said conductive plate and said two feeding and reading conductors being secured to said two plates intermediate said two plates, each of said two feeding conductors and each of said two reading conductors being in spaced-apart parallel relation, said two parallel feeding conductors being disposed in a direction perpendicular to said two parallel reading conductors, whereby said two feeding and reading conductors overlie one another at four points, at least one slot in said conductive plate extending through one of said four points in a plane transverse to said conductors, said feeding conductors being adapted to be connected to a source of input pulses, said reading conductors being adapted to be connected to means responsive to voltages induced therein when said input pulses are applied to said feeding conductors.

2. A magnetic memory device comprising at least two feeding conductors and two reading conductors, a plate for said conductors, said two feeding conductors being disposed in spaced-apart relation and substantially parallel to one another on said plate, said two reading conductors being disposed in spaced-apart relation and substantially parallel to one another on said plate and displaced 90 degrees from said feeding conductors, said conductors intersecting at four points and being insulated from one another at said points, said plate having four sections of substantially high permeability each one of which is disposed adjacent one of said four intersecting points, a conductive plate, a cover plate, said plates being secured together with said conductive plate intermediate said cover plate and said conductors disposed on said first-named plate, said conductive plate being in contact with said section of high magnetic permeability, at least one slot in said conductive plate disposed over one of said intersecting points whereat one of each of said conductors intersects, and at least one section of said cover plate overlying said slot being of substantially high permeability, said feeding conductors being adapted to be connected to a source of input pulses, said reading conductors being adapted to be connected to means responsive to voltages induced therein when said input pulses are applied to said feeding conductors.

3. A magnetic memory device comprising at least two insulated feeding conductors and two insulated reading conductors, a plate for said conductors, said two feeding conductors being disposed in spaced-apart relation and substantially parallel to one another on said plate, said two reading conductors being disposed in spaced-apart relation and substantially parallel to one another on said plate and displaced 90 degrees from said feeding conductors, said conductors intersecting at four points, said plate having four areas of substantially high permeability each one of which is disposed adjacent one of said four intersecting points, a conductive plate, a cover plate, said plates being secured together with said conductive plate intermediate said cover plate and said conductors disposed on said first-named plate, said conductive plate being in contact with said four highly permeable sections, at least two slots in said conductive plate angularly disposed relative to two of said intersecting points whereat alternate ones of each of said conductors intersect and are angularly disposed relative to one another, and at least two sections of said cover plate overlying said slots being of substantially high permeability, said feeding conductors being adapted to be connected to a source of input pulses, said reading conductors being adapted to be connected to means responsive to voltages induced therein when said input pulses are applied to said feeding conductors.

4. A magnetic memory device as set forth in claim 3, wherein said two feeding conductors and said two reading conductors are equally spaced therebetween.

5. A magnetic memory device as set forth in claim 3, wherein at least one of said cover plate and said first-named plate is made of a substantially highly permeable material.

6. A magnetic memory device as set forth in claim 3, wherein said first-named plate has two pairs of spaced-apart and parallel grooves therein, one pair of parallel grooves being disposed perpendicular to the other pair, said grooves of each pair being spaced equally, and said feeding conductors being disposed perpendicular to said reading conductors in said two pairs of parallel grooves.

7. A magnetic memory device comprising a plurality of insulated feeding conductors and a plurality of reading conductors, two plates having substantially high permeability, each of said plates being a separate mounting for one of said plurality of feeding conductors and said plurality of reading conductors, each of said two plates having a plurality of spaced-apart parallel grooves on both sides thereof, said grooves on one side of said plate being aligned with said grooves on the other side thereof, each one of said plurality of feeding conductors being disposed in one of said aligned grooves and extending over said sides of said one of said plates, each one of said plurality of reading conductors being disposed in one of said aligned grooves and extending over said sides of said other of said plates, a conducting plate, said two plates being secured together with said conducting plate therebetween, said two plates being arranged with said plurality of feeding conductors disposed substantially in a plane perpendicular to the direction of said plurality of reading conductors, whereby said conductors overlie one another at four points, said conducting plate having at least one opening therein adjacent an opposing one of each of said plurality of feeding and reading conductors and disposed in a plane extending through one of said points, and transverse to said conductors thereat, said feeding conductors being adapted to be connected to a source of input pulses, and said reading conductors being adapted to be connected to means responsive to the voltage induced therein when said input pulses are applied to said feeding conductors.

References Cited in the file of this patent

UNITED STATES PATENTS

| | | |
|---|---|---|
| 2,825,891 | Duinker | Mar. 4, 1958 |
| 2,825,892 | Duinker | Mar. 4, 1958 |